United States Patent [19]
Benz et al.

[11] Patent Number: 5,749,045
[45] Date of Patent: May 5, 1998

[54] METHOD FOR HANDLING ALARM CONDITIONS IN A PAGING SYSTEM

[75] Inventors: Roger E. Benz; Warren L. Schroeder; Kenneth T. Smelcer; Kevin W. Dahl; James A. Rodts, all of Quincy, Ill.

[73] Assignee: Glenayre Electronics, Inc., Charlotte, N.C.

[21] Appl. No.: 496,829

[22] Filed: Jun. 29, 1995

[51] Int. Cl.⁶ .................................................. H04Q 7/00
[52] U.S. Cl. .................... 455/31.2; 455/521; 455/403; 455/404; 379/39; 379/50; 340/502; 340/825.44
[58] Field of Search .................... 379/57, 39, 40, 379/42, 47, 49, 50, 34, 37, 38, 56; 340/511, 502, 539, 311.1, 825.44, 286.02, 825.36, 825.31, 825.32, 506, 508, 522, 825.06, 825.08; 455/38.2, 38.1, 31.2, 404, 521, 403; 364/514, 580

[56] References Cited

U.S. PATENT DOCUMENTS

| | | | |
|---|---|---|---|
| 4,856,047 | 8/1989 | Saunders | 455/31.2 |
| 4,887,291 | 12/1989 | Stillwell | 379/57 |
| 4,928,099 | 5/1990 | Drake . | |
| 4,977,399 | 12/1990 | Price et al. . | |
| 5,113,413 | 5/1992 | Brown et al. | 375/267 |
| 5,128,979 | 7/1992 | Reich et al. | 379/39 |
| 5,319,355 | 6/1994 | Russek . | |
| 5,359,317 | 10/1994 | Gomez et al. . | |
| 5,379,030 | 1/1995 | Nolan et al. . | |
| 5,384,565 | 1/1995 | Cannon . | |
| 5,416,725 | 5/1995 | Pacheco et al. | 364/514 |
| 5,436,620 | 7/1995 | Ide | 340/825.44 |
| 5,493,285 | 2/1996 | Yoshizawa | 379/57 |
| 5,534,851 | 7/1996 | Russek | 340/502 |

Primary Examiner—Dwayne D. Bost
Assistant Examiner—Tracy M. Legree
Attorney, Agent, or Firm—Christensen, O'Connor Johnson & Kindness PLLC

[57] ABSTRACT

A method for handling alarm conditions from paging stations in a paging system is disclosed. The paging system includes a paging terminal, a plurality of paging stations, and a network manager. When a paging station has an alarm condition, the paging station forwards the alarm to the network manager, which in turn, compares the alarm with an alarm record for that paging station and determines whether or not that alarm is a higher priority than the previous alarms received from the paging station. If so, the network manager transmits a signal to the paging terminal to page the technician responsible for servicing that particular paging station. The technician is paged and dispatched to the paging station for service.

12 Claims, 5 Drawing Sheets

| | 505 | 507 | 509 | 511 | 513 | 515 |
|---|---|---|---|---|---|---|
| | DATE | TIME | SITE ID | DESCRIPTION | SERIAL NO. | PAGE? |
| 503 { | 1/01/95 | 14:27 | 0008 | RF INPUT ALARM | 0081 | Y |
| | 1/01/95 | 14:38 | 0004 | SYCHRONIZATION FAILURE | 0082 | N |

METHOD FOR HANDLING ALARM CONDITIONS IN A PAGING SYSTEM

FIELD OF THE INVENTION

The present invention relates to paging systems, and more particularly, to an improved method of handling alarm conditions from paging transmitters within the paging system.

BACKGROUND OF THE INVENTION

Paging systems typically include a paging terminal that interfaces with the public switch telephone network (PSTN) and a plurality of paging transmitters that provide signal coverage over a wide geographic region. Examples of such paging systems are described in U.S. Pat. Nos. 5,365,569, 5,369,682, and 5,416,808, all to Witsaman et al. and commonly assigned to the assignee of the present invention and expressly incorporated by reference herein. These paging systems and others of the prior art are generally configured to allow the simulcasting of a paging signal through all of the paging transmitters of the paging system. By having many geographically spaced-apart paging transmitters, a wide geographic region can be reached by the signals of the paging system. The geographic region may be in some cases citywide, statewide, or even nationwide.

As with any large complex system, one or more of the components may fail and require repair from time to time by trained technicians. In the paging system context, the components that fail most often, simply by virtue of the large number of these components, are the paging transmitters. Paging transmitters are also referred to as either paging stations or base stations.

These paging stations may experience failures that impede the ability of the paging stations to operate correctly. These failures lead to what is known in the art as an alarm condition. Upon such an alarm condition, the paging system must react by dispatching technical personnel to the paging station to correct the paging station failure that resulted in the alarm condition.

SUMMARY OF THE INVENTION

The present invention is a method for handling alarm conditions at the paging stations of a paging system. The paging system includes a paging terminal, a plurality of paging stations, and a network manager. In operation, when a paging station has an alarm condition, the paging station contacts the network manager via a dial-up modem over the public switch telephone network. The paging station then informs the network manager of the particular parameters of the alarm, including the alarm condition, the time of the alarm condition, and the identification of the paging station.

In one aspect of the present invention, the network manager compares the alarm condition with an alarm record for that paging station and determines whether or not the received alarm condition is a higher priority than the previous alarm conditions received from the paging station. If so, the network manager forwards a paging alert to the paging terminal to page a technician responsible for servicing that particular paging station. The technician is paged and dispatched to the paging station for service. In addition, the alarm condition is logged into an alarm record for that particular paging station. If the received alarm condition is not of higher priority than any of the previous alarm conditions received from the paging station, then the network manager logs the alarm condition into the alarm record.

In accordance with other aspects of the present invention, when an alarm is received from a paging station, the network manager determines whether the alarm condition is a new alarm condition or whether it is a repeat of an old alarm condition. If it is a new alarm condition, then a technician is paged and dispatched to the paging station. In addition, the alarm condition is logged into the alarm record. However, if the alarm is an old alarm condition, a technician is not repaged. The alarm condition is logged into the alarm record.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is an example of an alarm record.

DETAILED DESCRIPTION OF THE PREFERRED EMBODIMENT

Figure 1:
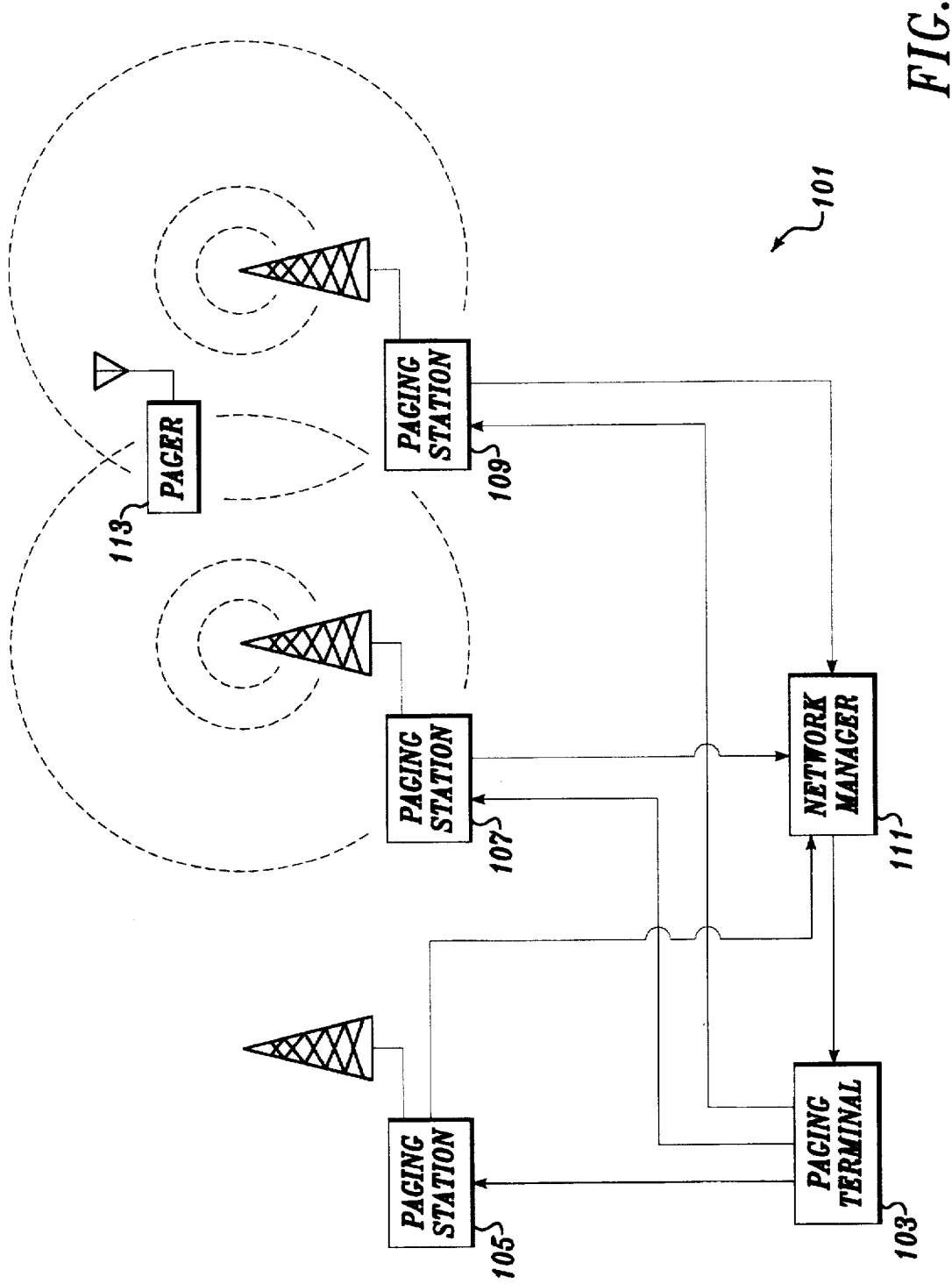
FIG. 1 is a schematic diagram of a paging system configured to operate in accordance with the present invention.

Turning to FIG. 1, there is shown a paging system 101 in schematic format. The paging system 101 includes a paging terminal 103, a plurality of paging stations 105, 107, and 109, and a network manager 111. Also shown in FIG. 1 is a portable communications device, commonly known as a pager 113.

Each of the paging stations 105–109 are communicatively connected to the network manager 111 via one of several alternative methods. In the preferred embodiment, the paging stations 105–109 are connected via dial-up modems using the public switched telephone network (PSTN). Alternatively, the paging stations 105–109 could be in communication with the network manager 111 by means of microwave point-to-point communication systems.

The paging terminal 103 is similarly connected to the paging stations 105–109. The communications may be accomplished via the public switch telephone network, microwave point-to-point communications, or satellite communications. The infrastructure upon which the communications between the paging terminal 103 and the paging stations 105–109 are carried forth are known as the link system.

The network manager 111 can be located at the same locale as the paging terminal 103. This proximity of location makes communications between the network manager and paging terminal substantially simplified. As seen in FIG. 1, the network manager is communicatively connected with the paging terminal 103. In the preferred embodiment, this connection is a direct RS-232 connection.

The network manager 111 serves two primary functions. First, the network manager serves to configure the paging system. Those skilled in the art recognize the types of paging system configuration that are necessary. Insofar as this aspect of the network manager 111 is not particularly germane to the present invention, this function of the network manager 111 will not be discussed further herein.

Second, and more germane to the present invention, the network manager 111 serves to monitor the alarm conditions from the paging stations 105–109. Thus, a major function of the network manager 111 is to receive alarms from paging stations 105–109 and notify technical personnel of the alarms.

Figure 4:
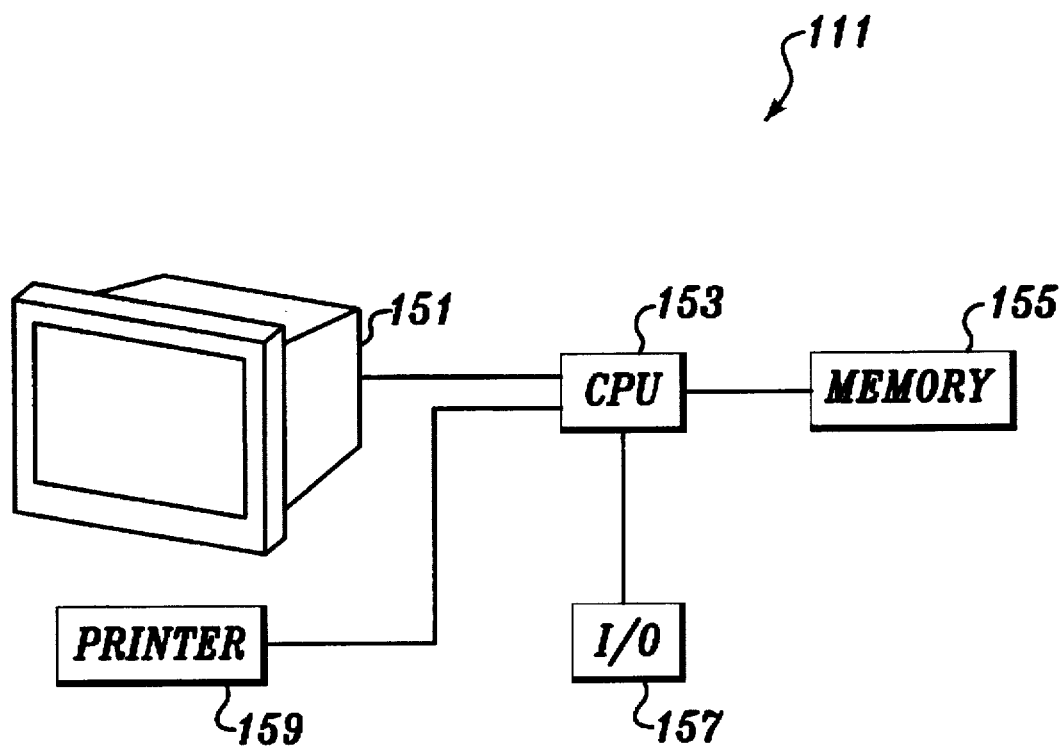
FIG. 4 is a schematic diagram of a network manager capable of implementing the present invention.

As seen in FIG. 4, the network manager 111 includes a CPU 153, a monitor 151, memory 155, input/output device 157, and printer 159. In the preferred embodiment, the network manager 111 is an IBM-compatible personal computer. As noted above, a principal function of network manager 111 is to receive and process alarms from paging stations 105–109. Upon receipt of an alarm from a paging station, the network manager 111 may provide an audible alarm. In addition, printer 159 may provide a printed record of the alarm received from the paging station. The printed records of the alarm will include information such as the date and time at which the alarm occurred, the paging station's ID, which identifies the particular paging station experiencing the alarm, an alarm identifier and description which describes the alarm being experienced, and an alarm serial number.

Turning to FIG. 5, an alarm record 501 having a plurality of alarms 503 is shown. The alarm record 501 is stored in memory 155 of the network manager 111. An alarm record 501 is stored on each paging station 105–109 in the paging system 101. The alarm record 501 is a comprehensive archive of all of the alarm conditions experienced by a particular paging station. As seen in FIG. 5, each alarm 503 includes the date 505 and time 507 at which the alarm occurred, the paging station's ID 509, an alarm identifier and description 511 which describes the alarm being experienced, an alarm serial number 513, and a page sent indication 515. The page sent indication 515 indicates whether a page to a technician was sent as a result of the alarm. By virtue of the present invention further described below, not all alarms will result in a page being sent to a technician.

In a paging system 101 with tens or even hundreds of paging stations each reporting multiple alarms, a paging system administrator can quickly see tens or hundreds of alarms in a short period of time. This avalanche of alarms quickly overwhelms the administrator. The present invention is designed to alleviate such difficulties by filtering the alarms received from various paging stations.

Figure 2:
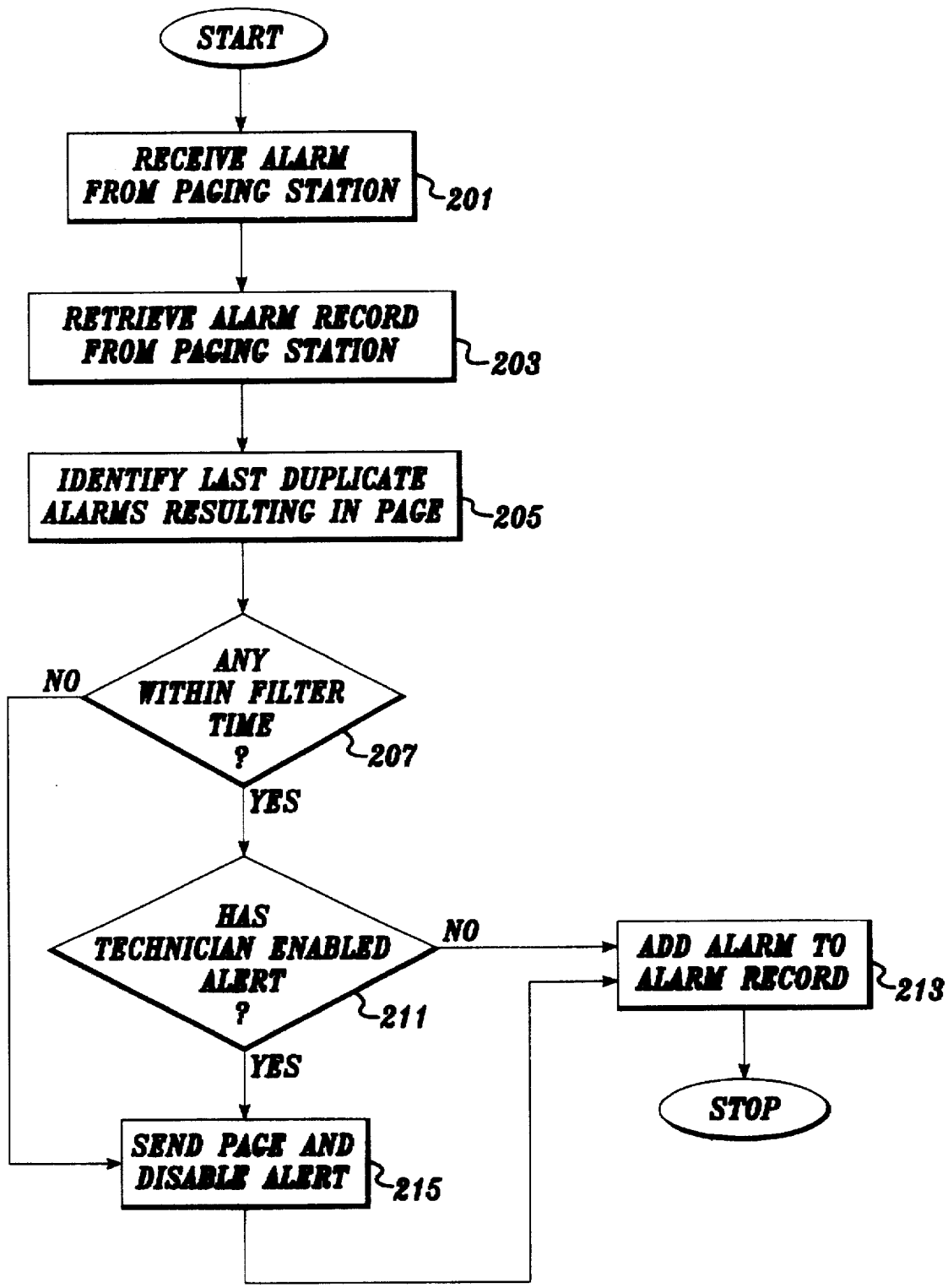
FIG. 2 is a flow diagram illustrating the method of filtering duplicative alarms from a paging station.

In particular, turning to FIG. 2, at box 201, a paging station transmits an alarm (referred to as the "current alarm") to the network manager 111. The transmission of the current alarm is typically via a dedicated dial-up modem, indicated in FIG. 4 as I/O 157. Next, the network manager 111 at box 203 retrieves the alarm record 501 of the paging station from memory 155. Next, at box 205, all alarms that are duplicates (based upon the alarm ID and description 511 field) to the current alarm and that resulted in a page being sent (as determined by the page sent indication 515 field) are identified. Oftentimes, the paging station 105 will keep sending duplicate alarms to the network manager 111 if a technician has not corrected the alarm condition within a predetermined amount of time.

At box 207, of the previous alarms identified in box 205, a determination is made as to whether any of these previous alarms are within a predetermined filter time from the time of the current alarm. The filter time in the preferred embodiment is four hours, but can be set by the paging system administrator to any length of time. If there are no previous alarms that are: (1) duplicates to the current alarm, (2) resulted in a page being sent, and (3) within the filter time, then at box 215, a page is sent to the technician and the ALERT_ENABLE flag (discussed below) is disabled. Specifically, the technician is alerted by having the network manager 111 page the technician via the paging terminal 103 of the paging system 101. Next, at box 213, the current alarm is added to the alarm record and the processing for the current alarm (now considered a previous alarm for all future alarms) is complete.

If, however, at box 207, it is determined that there is a previous alarm that: (1) is a duplicate to the current alarm, (2) resulted in a page being sent, and (3) within the filter time, then at box 211, another determination is made. Specifically, at box 211, a determination is made as to whether a binary flag, ALERT_ENABLE, has been set to high status by the technician. The ALERT_ENABLE flag is used to indicate whether or not a technician should be alerted when a current duplicate alarm is present, regardless of whether or not the current alarm is within the filter time to a previous alarm resulting in a page. Thus, when the ALERT_ENABLE flag is set to high, the technician will be alerted to a current alarm (by page) even if the current alarm is a duplicate resulting in a page within the filter time as determined in box 207. This is executed at box 215. In addition, the ALERT_ENABLE flag is reset to low after the page is sent to the technician. Next, control returns to box 213 and the current alarm is added to the alarm record.

If, however, at box 211, the ALERT_ENABLE flag is set to low and the current alarm is a duplicate alarm, then the technician will not be alerted. The current alarm will be added to the alarm record at box 213. After box 213, the current alarm will be treated as a "previous alarm" in the alarm record.

To illustrate the above handling of paging alarms in accordance with the present invention, the following example is provided. Assume that a paging station sends an alarm to the network manager at 1:00 p.m. signaling a LOW_OUTPUT_POWER alarm. Assume further that the filter time is preset to be 4 hours long and the record is empty. The first alarm at 1:00 p.m. will result in a page being sent to the technician because the alarm record is empty. There are no previous alarms that meet the criteria of boxes 205 and 207. Thus, a page will be sent to the technician at box 215, the ALERT_ENABLE flag is disabled, and the current alarm at 1:00 p.m. will be added to the alarm record at box 213.

Taking the example further, assume that duplicate alarms appear at 2:00 p.m., 3:00 p.m., and 4:00 p.m. These alarms will not result in a page of the technician. The 2:00 p.m. alarm in proceeding through the process of FIG. 2 will not result in a page because at boxes 205 and 207, the 1:00 p.m. alarm will be identified as being a duplicate alarm that resulted in a page. Further, the 1:00 p.m. alarm is within the filter time of four hours from the 2:00 p.m. alarm. In this example, assume that the technician has not enabled the ALERT_ENABLE flag (discussed below further). Therefore, at box 213, the alarm will simply be added to the alarm record.

Taking the example still further, assume that a LOW_OUTPUT_POWER current alarm appears at 5:05 p.m. This current alarm will result in a page to the technician. With reference to FIG. 2, in response to the current alarm, at box 205, the 1:00 p.m. alarm will be identified. Next, at box 207, it will be determined that the 1:00 p.m. alarm is outside the four hour filter time from the 5:05 p.m. current alarm. Therefore, a page will be sent to the technician at box 215, the ALERT_ENABLE flag disabled, and at box 213, the current alarm will be added to the alarm record.

Finally, adding further to this example, assume that at 3:05 p.m., the technician enables the ALARM_ENABLE flag. This can be done using DTMF tone or by dial up modem or personally at the network manager 111. Although the 3:00 p.m. alarm will be treated the same as above, the 4:00 p.m. alarm will be treated differently. For example, through box 205 and 207, the 1:00 p.m. alarm will be identified as satisfying the criteria of those boxes. Next, at box 211, the check of the ALERT_ENABLE flag uncovers that the flag is high. Therefore, a page is sent to the technician and the ALERT_ENABLE flag is reset to low. The current alarm is then added to the alarm record at box 213.

In accordance with another aspect of the present invention, the "screening" of alarms from paging stations illustrated in FIG. 2 can be modified to operate on another parameter, namely, the parameter of priority.

Figure 3:
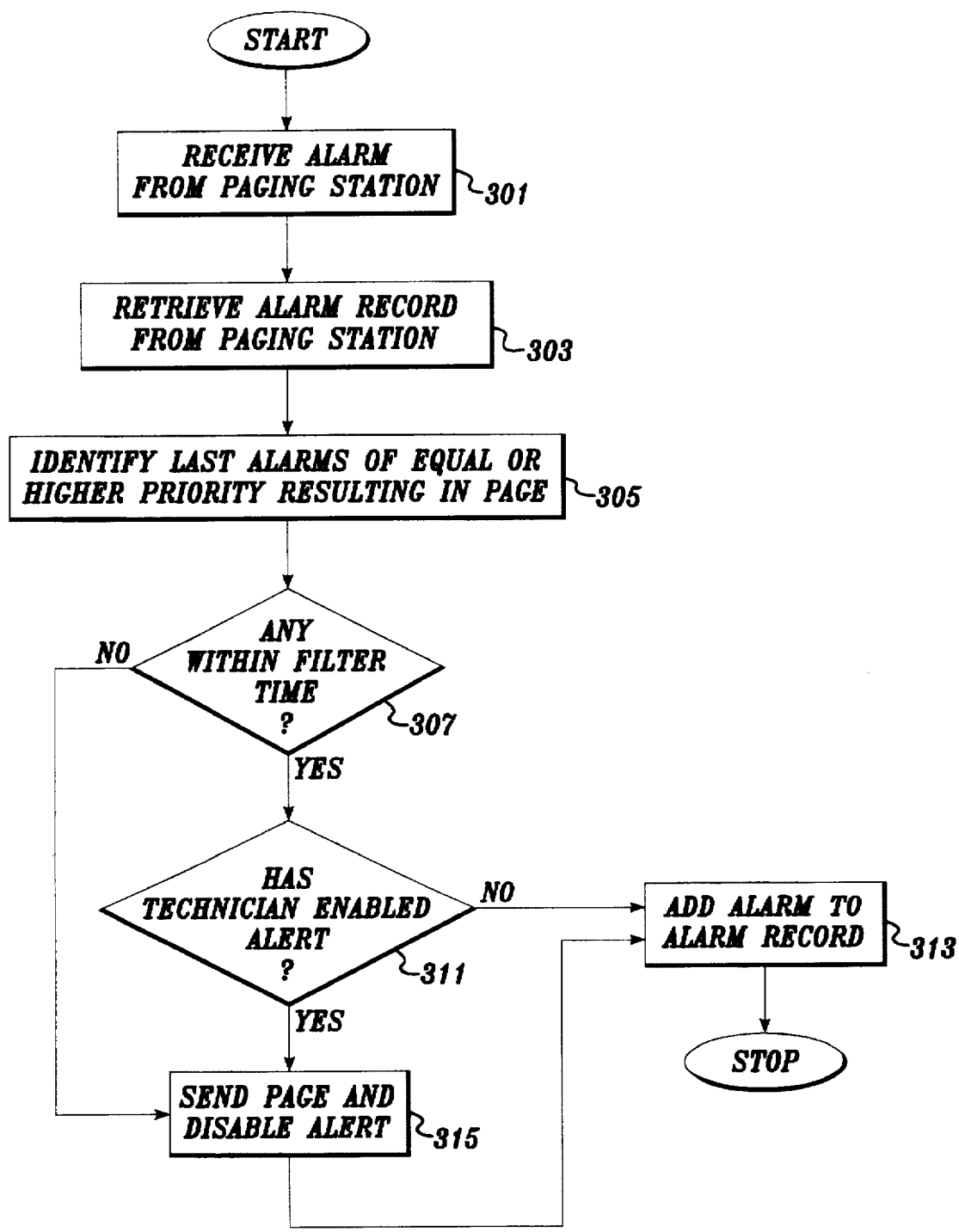
FIG. 3 is a flow diagram illustrating the method of prioritizing alarms from a paging station.

Turning to FIG. 3, at box 301, a paging station transmits an alarm (referred to as the "current alarm") to the network manager 111. The transmission of the current alarm is typically via a dedicated dial-up modem, indicated in FIG. 4 as I/O 157. Next, the network manager 111 at box 303 retrieves the alarm record 501 of the paging station from memory 155. Next, at box 305, all alarms that are of equal or higher priority (based upon the alarm ID and description 511 field) to the current alarm and that resulted in a page being sent (as determined by the page sent indication 515 field) are identified. Alternatively, in some paging systems, each alarm sent by a paging station will further include a priority field that provides a numeric assignment as to the priority of the alarm. The priority of the alarm can then be determined from the priority field of the alarm.

As can be appreciated by those skilled in the art, each paging alarm has different priority assigned thereto. This priority can then be used to classify the alarm relative to the other alarms. An example of a relatively low priority alarm would be OUTER_DOOR_OPEN, indicating that the outer door to the paging station is open. An example of a mid-level alarm would be LOW_OUTPUT_POWER, indicating that the power output of the paging station is low. An example of a high priority alarm is STATION_CONTROL_FAILURE, indicating that the control of the paging station has failed. This latter case would almost always result in catastrophic failure of the paging station. In contrast, the first two alarms may or may not result in degraded paging station operation.

At box 307, of the previous alarms identified in box 305, a determination is made as to whether any of these previous alarms are within a predetermined filter time from the time of the current alarm. The filter time in the preferred embodiment is four hours, but can be set by the paging system administrator to any length of time. If there are no previous alarms that are: (1) equal or higher priority to the current alarm, (2) resulted in a page being sent, and (3) within the filter time, then at box 315, a page is sent to the technician. Specifically, the technician is alerted by having the network manager 111 page the technician via the paging terminal 103 of the paging system 101. Next, at box 313, the current alarm is added to the alarm record and the processing for the current alarm (now considered a previous alarm for all future alarms) is complete.

If, however, at box 307, it is determined that there is a previous alarm that: (1) is of equal or higher priority to the current alarm, (2) resulted in a page being sent, and (3) within the filter time, then at box 311, another determination is made. Specifically, at box 311, a determination is made as to whether a binary flag, ALERT_ENABLE, has been set to high status by the technician. The ALERT_ENABLE flag is used to indicate whether or not a technician should be alerted when a current alarm is present, regardless of whether or not the current alarm is within the filter time to a previous alarm resulting in a page. Thus, when the ALERT_ENABLE flag is set to high, the technician will be alerted to a current alarm (by page) even if there is a previous alarm that is of equal or higher priority resulting in a page within the filter time to the current alarm, as determined in box 307. This is executed at box 315. In addition, the ALERT_ENABLE flag is reset to low after the page is sent to the technician. Next, control returns to box 313 and the current alarm is added to the alarm record.

If, however, at box 311, the ALERT_ENABLE flag is set to low and there is a previous alarm that is of equal or higher priority to the current alarm, then the technician will not be alerted. The current alarm will be added to the alarm record at box 313. After box 313, the current alarm will be treated as a "previous alarm" in the alarm record.

To illustrate the above handling of paging alarms in accordance with the present invention, this example is provided. Assume that a paging station sends an alarm to the network manager at 1:00 p.m. signaling a LOW_OUTPUT_POWER alarm. Assume further that the filter time is preset to be 4 hours long and the alarm record is empty. The first alarm at 1:00 p.m. will result in a page being sent to the technician because the alarm record is empty. There are no previous alarms that meet the criteria of boxes 305 and 307. Thus, a page will be sent to the technician at box 315, the ALERT_ENABLE flag is disabled, and the current alarm at 1:00 p.m. will be added to the alarm record at box 313.

Taking the example further, assume that further alarms appear at 2:00 p.m., 3:00 p.m., and 4:00 p.m. that are of lower priority than the 1:00 p.m. alarm. These alarms will not result in a page of the technician. The 2:00 p.m. alarm in proceeding through the process of FIG. 3 will not result in a page because at boxes 305 and 307, the 1:00 p.m. alarm will be identified as being of equal or higher priority alarm that resulted in a page. Further, the 1:00 p.m. alarm is within the filter time of four hours from the 2:00 p.m. alarm. In this example, assume that the technician has not enabled the ALERT_ENABLE flag (discussed below further). Therefore, at box 313, the current alarm will simply be added to the alarm record.

Taking the example further, assume that a STATION_CONTROL_FAILURE alarm appears at 2:00 p.m. This alarm will result in a page of the technician. The 2:00 p.m. alarm in proceeding through the process of FIG. 2 will result in a page because at boxes 305, the 1:00 p.m. alarm will not be identified as being of equal or higher priority alarm that resulted in a page. Thus, at box 307, there are no previous alarms that are within the filter time. Therefore, at box 315 a page will be sent, the ALERT_ENABLE flag is disabled, and at box 313, the current alarm will be added to the alarm record.

Taking the example still further, assume that a OUTER_DOOR_OPEN current alarm appears at 5:05 p.m. This current alarm will result in a page to the technician. With reference to FIG. 3, in response to the current alarm, at box 205, the 1:00 p.m. alarm will be identified as being of equal or higher priority. Next, at box 307, it will be determined that the 1:00 p.m. alarm is outside the four hour filter time from the 5:05 p.m. current alarm. Therefore, a page will be sent to the technician at box 315, the ALERT_ENABLE flag disabled, and at box 313, the current alarm will be added to the alarm record.

Adding still further to this example, assume that at 3:05 p.m., the technician enables the ALARM_ENABLE flag. This can be done using DTMF tone, by dial up modem or personally at the network manager 111. Assume next that at 4:00 p.m. a OUTER_DOOR_OPEN alarm is received. Through box 305 and 07, the 1:00 p.m. alarm will be identified as satisfying the criteria of those boxes. Next, at box 311, the check of the ALERT_ENABLE flag uncovers that the flag is high. Therefore, a page is sent to the technician and the ALERT_ENABLE flag is reset to low. The current alarm is then added to the alarm record at box 313.

Furthermore, in some paging systems, the paging stations are also assigned to a subgroup of paging stations, and thus, each alarm from the paging station will also include an additional field identifying the subgroup to which the paging station belongs. In an alternative embodiment of the present invention, all paging stations of the subgroup will be considered one paging station. Thus, if an alarm comes from one paging station in the subgroup, this alarm will have an effect of all of the paging stations within the subgroup. Specifically, at boxes 203 and 303, the alarm records from all of the paging stations will be retrieved and analyzed. This is yet another method of using the present invention to filter alarms from a paging system.

While the preferred embodiment of the invention has been illustrated and described, it will be appreciated that various changes can be made therein without departing from the spirit and scope of the invention. For example, in the preferred embodiment, the screening mechanism in one example is duplicate alarms and in the second example priority of the alarms. It can be appreciated that any of the other parameters in alarms can be used to screen alarms. For example, the alarms can be screened by paging station ID. Thus, any alarms coming from a particular station will not result in a page unless it is outside the filter time or unless the technician has enabled the ALERT_ENABLE flag.

In addition, although the present invention is described as providing filtering based upon duplication (FIG. 2) and filtering based upon priority (FIG. 3), these can these filters can be combined whereby the system will filter alarms based on both on duplicate alarms and priority of alarms.

The embodiments of the invention in which an exclusive property or privilege is claimed are defined as follows:

1. A method of processing a current alarm in a paging system said paging system including a plurality of paging stations and a network manager said current alarm originating from a one of said paging stations to indicate an alarm condition at said one of said paging stations, the method including the steps of:

maintaining an alarm record said alarm record including a record of previous alarms received from each said one of said paging stations;

comparing said current alarm with a predetermined set of said previous alarms in said alarm record to determine if said current alarm is a duplicate of any of said predetermined set of said previous alarms;

alerting a technician of said current alarm if said current alarm is not a duplicate of any of said predetermined set of said previous alarms; and determining whether an ALERT_ENABLE flag is high, and if so, even if said current alarm is a duplicate of any of said predetermined set of said previous alarms, alerting the technician.

2. The method of claim 1 further including the step of determining said set of predetermined previous alarms as those previous alarms within a predetermined filter time of said current alarm.

3. The method of claim 2 further including the step of determining said set of predetermined previous alarms as those previous alarms within a predetermined filter time of said current alarm and as those previous alarms that resulted in said technician being alerted.

4. The method of claim 1 further including the step of determining said set of predetermined previous alarms as those previous alarms that resulted in said technician being alerted.

5. The method of claim 1 wherein the step of alerting includes the step of sending a page to said technician through said paging system.

6. The method of claim 1 further including the step of adding said current alarm to said alarm record.

7. A method of processing a current alarm in a paging system, said paging system including a plurality of paging stations and a network manager, said current alarm originating from a one of said paging stations to indicate an alarm condition at said one of said paging stations, the method including the steps of:

maintaining an alarm record, said alarm record including a record of previous alarms received from each said one of said paging stations;

comparing said current alarm with a predetermined set of said previous alarms in said alarm record to determine if said current alarm is of higher priority than any of said predetermined set of said previous alarms;

alerting a technician of said current alarm only if said current alarm is of higher priority than any of said predetermined set of said previous alarms; and determining whether an ALERT_ENABLE flag is high, and if so, even if said current alarm is of lower priority than any of said predetermined set of said previous alarms, alerting the technician.

8. The method of claim 7 further including the step of determining said set of predetermined previous alarms as those previous alarms within a predetermined filter time of said current alarm.

9. The method of claim 8 further including the step of determining said set of predetermined previous alarms as those previous alarms within a predetermined filter time of said current alarm and as those previous alarms that resulted in said technician being alerted.

10. The method of claim 7 further including the step of determining said set of predetermined previous alarms as those previous alarms that resulted in said technician being alerted.

11. The method of claim 7 wherein the step of alerting includes the step of sending a page to said technician through said paging system.

12. The method of claim 7 further including the step of adding said current alarm to said alarm record.

* * * * *